United States Patent
Maurya et al.

(10) Patent No.: US 11,295,610 B2
(45) Date of Patent: Apr. 5, 2022

(54) SYSTEM AND METHOD FOR GENERATING AN ALERT BASED ON CHANGE IN TRAFFIC PATTERN

(71) Applicant: HCL Technologies Limited, Noida (IN)

(72) Inventors: Arvind Kumar Maurya, Noida (IN); Akhilesh Kumar Gupta, Noida (IN)

(73) Assignee: HCL Technologies Limited, Noida (IN)

( * ) Notice: Subject to any disclaimer, the term of this patent is extended or adjusted under 35 U.S.C. 154(b) by 219 days.

(21) Appl. No.: 16/247,589

(22) Filed: Jan. 15, 2019

(65) Prior Publication Data

US 2019/0221113 A1 Jul. 18, 2019

(30) Foreign Application Priority Data

Jan. 18, 2018 (IN) .............................. 201811002032

(51) Int. Cl.
*G08G 1/01* (2006.01)
*G06N 20/00* (2019.01)

(52) U.S. Cl.
CPC ........... *G08G 1/0141* (2013.01); *G06N 20/00* (2019.01); *G08G 1/0129* (2013.01); *G08G 1/0133* (2013.01)

(58) Field of Classification Search
CPC .. G08G 1/0141; G08G 1/0133; G08G 1/0129; G06N 20/00
See application file for complete search history.

(56) References Cited

U.S. PATENT DOCUMENTS

| | | |
|---|---|---|
| 7,155,376 B2 | 12/2006 | Yang et al. |
| 8,532,965 B2 | 9/2013 | Hirata et al. |
| 9,460,615 B2 | 10/2016 | Basalamah |
| 9,965,952 B2 | 5/2018 | Abraham et al. |
| 10,002,530 B1 * | 6/2018 | Liu ..................... G06K 9/00785 |
| 2009/0138497 A1 | 5/2009 | Zavoli et al. |
| 2010/0076671 A1 | 3/2010 | Pryakhin et al. |
| 2018/0330606 A1 * | 11/2018 | Shanahan ............ G08G 1/0133 |

FOREIGN PATENT DOCUMENTS

JP 2008059181 A 3/2008

* cited by examiner

*Primary Examiner* — Michael V Kerrigan
(74) *Attorney, Agent, or Firm* — Kendal Sheets

(57) ABSTRACT

The present disclosure relates to system(s) and method(s) for generating an alert based on change in traffic pattern. The system receives historic traffic data and current traffic data, associated with each road segment, from a set of road segments. Further, the system identifies a change traffic pattern based on analysing the historic traffic pattern and the current traffic pattern, using data analytics and a machine learning algorithm. Furthermore, the system identifies a sub-set of road segments, from the set of road segments, based on comparison of the change in traffic pattern and a pre-defined threshold. The system further determines root cause of change in traffic pattern by analysing the sub-set of road segments. Further, the system generates an alert for updating one or more road segments, from the sub-set of road segments, based on the root cause of change in traffic pattern.

11 Claims, 3 Drawing Sheets

SYSTEM AND METHOD FOR GENERATING AN ALERT BASED ON CHANGE IN TRAFFIC PATTERN

CROSS-REFERENCE TO RELATED APPLICATIONS AND PRIORITY

The present application claims benefit from Indian Complete Patent Application No 201811002032 filed on 18 Jan. 2018 the entirety of which is hereby incorporated by reference.

TECHNICAL FIELD

The present disclosure in general relates to the field of traffic monitoring. More particularly, the present invention relates to a system and method for generating an alert based on change in traffic pattern.

BACKGROUND

Nowadays, multiple navigation platforms are available for guiding a user. The navigation platforms provide some features such as navigation to an address, defining routes, finding nearby point of interests, and the like. The navigation platforms fetch data from other sources to generate map.

However, the data stored in the other sources is not static and keeps changing based on construction of new roads, blockage of roads and the like. Thus, the data needs to be updated on regular basis to reflect exact and accurate map of a geographical location. However, usually the data, in the other sources, is updated after a predefined time interval. Further, the navigation platforms fail to generate exact and accurate map of the geographical location as the data is not updated on regular basis. Therefore, users may face problems while travelling according to the generated map.

SUMMARY

Before the present systems and methods for generating an alert based on change in traffic pattern, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for generating the alert based on change in traffic pattern. This summary is not intended to identify essential features of the claimed subject matter nor is it intended for use in determining or limiting the scope of the claimed subject matter.

In one implementation, a method for generating an alert based on change in traffic pattern is illustrated. In one embodiment, the method may comprise receiving traffic data, associated with a set of road segments in a geographical area. The traffic data may comprise historic traffic data and current traffic data, associated with the set of road segments. Once the historic traffic data and the current traffic data are received, the method may comprise identifying a change in traffic pattern based on analysis of the historic traffic data and the current traffic data, for each road segment, from the set of road segments. In one embodiment, the historic traffic data and the current traffic data may be analysed using data analytics and a machine learning algorithm. Further, the method may comprise identifying a sub-set of road segments, from the set of road segments. The sub-set of road segments may be identified based on comparison of the change in traffic pattern with a pre-defined threshold. Furthermore, the method may comprise analysing each road segment, from the sub-set of road segments, to determine a root cause of the change in traffic pattern. The method may further comprise generating an alert corresponding to one or more road segments, from the sub-set of road segments. The alert may be generated based on the root cause of the change in traffic pattern, associated with the one or more road segments.

In one implementation, a system for generating an alert based on change in traffic pattern is illustrated. The system comprises a memory and a processor coupled to the memory, further the processor is configured to execute programmed instructions stored in the memory. In one embodiment, the processor may execute programmed instructions stored in the memory for receiving traffic data associated with a set of road segments in a geographical area. The traffic data may comprise historic traffic data and current traffic data, associated with the set of road segments. Once the historic traffic data and the current traffic data are received, the processor may execute programmed instructions stored in the memory for identifying a change in traffic pattern based on analysis of the historic traffic data and the current traffic data, for each road segment, from the set of road segments. In one embodiment, the historic traffic data and the current traffic data may be analysed using data analytics and a machine learning algorithm. Further, the processor may execute programmed instructions stored in the memory for identifying a sub-set of road segments, from the set of road segments. The sub-set of road segments may be identified based on comparison of the change in traffic pattern with a pre-defined threshold. Furthermore, the processor may execute programmed instructions stored in the memory for analysing each road segment, from the sub-set of road segments, to determine a root cause of the change in traffic pattern. The processor may further execute programmed instructions stored in the memory for generating an alert corresponding to one or more road segments, from the sub-set of road segments. The alert may be generated based on the root cause of the change in traffic pattern, associated with the one or more road segments.

In yet another implementation, a computer program product having embodied computer program for generating an alert based on change in traffic pattern is disclosed. In one embodiment, the program may comprise a program code for receiving traffic data associated with a set of road segments in a geographical area. The traffic data may comprise historic traffic data and current traffic data, associated with the set of road segments. Once the historic traffic data and the current traffic data is received, the program may comprise a program code for identifying a change in traffic pattern based on analysis of the historic traffic data and the current traffic data, for each road segment, from the set of road segments. In one embodiment, the historic traffic data and the current traffic data may be analysed using data analytics and a machine learning algorithm. Further, the program may comprise a program code for identifying a sub-set of road segments, from the set of road segments. The sub-set of road segments may be identified based on comparison of the change in traffic pattern with a pre-defined threshold. Furthermore, the program may comprise a program code for analysing each road segment, from the sub-set of road segments, to determine a root cause of the change in traffic pattern. The program may further comprise a program code for generating an alert corresponding to one or more road segments, from the sub-set of road segments. The alert may be generated based on the root cause of the change in traffic pattern, associated with the one or more road segments.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "identifying", "analysing", "generating", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating an alert based on change in traffic pattern are now described. The disclosed embodiments of the system and method for generating the alert based on change in traffic pattern are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for generating an alert based on change in traffic pattern is not intended to be limited to the embodiments illustrated, but is to be accorded the widest scope consistent with the principles and features described herein.

The present subject matter relates to generating an alert based on change in traffic pattern. In one embodiment, traffic data, associated with a set of road segments in a geographical area, is received from one or more external sources. In one aspect, the traffic data may comprise historic traffic data and current traffic data. Further, the historic traffic data and the current traffic data may be analysed using data analytics and a machine learning algorithm. Based on the analysis, a change in traffic pattern of each road segment, from the set of road segments, may be identified. Once the change in traffic pattern is identified, a sub-set of road segments, from the set of road segments, may be identified. The sub-set of road segments may be identified based on comparing the change in traffic pattern with a pre-defined threshold. Further, a root cause of change in traffic pattern, associated with the sub-set of road segments, may be identified. The root cause of change in traffic pattern may be based on analysing each road segment, from the sub-set of road segments. Furthermore, an alert may be generated based on the root cause of change in traffic pattern. The alert may be generated for updating one or more road segments, from the sub-set of road segments. Further, the network implementation of system for generating an alert based on change in traffic pattern is illustrated with FIG. 1.

Figure 1:
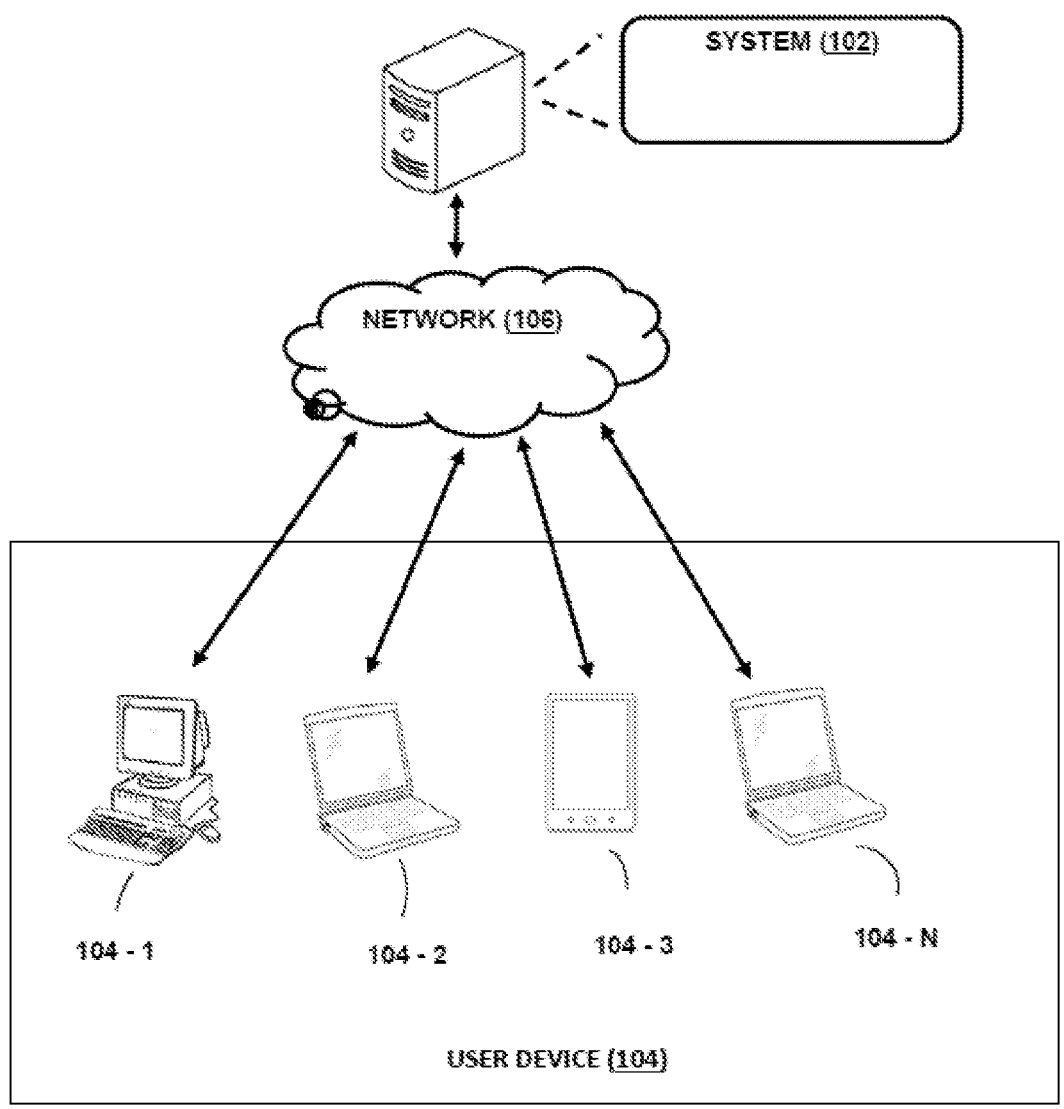
FIG. 1 illustrates a network implementation of a system for generating an alert based on change in traffic pattern, in accordance with an embodiment of the present subject matter.

Referring now to FIG. 1, a network implementation 100 of a system 102 for generating an alert based on change in traffic pattern disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to receive traffic data from one or more external sources. The traffic data may be associated with a set of road segments in a geographical area. The traffic data may comprise historic traffic data and current traffic data. In one example, the current traffic data may correspond to a real-time traffic data. Once the historic traffic data and the current traffic data are received, the system 102 may analyse the historic traffic data and the current traffic data. In one aspect, the historic traffic data and the current traffic data may be analysed using data analytics and a machine learning algorithm. Based on the analysis, the system 102 may identify a change in traffic pattern, associated with each road segment, from the set of road segments. In one aspect, the change in traffic pattern may correspond to a traffic density, associated with each road segment, from the set of road segments.

Upon identifying the change in traffic pattern, the system 102 may be configured to compare the change in traffic pattern with a pre-defined threshold. Further, the system 102 may be configured to identify a sub-set of road segments, from the set of road segments, based on the comparison of the change in traffic pattern and the pre-defined threshold. In one example, the sub-set of road segments may correspond to road segments with increase in the traffic density or the road segments with decrease in the traffic density.

Once the sub-set of road segments are identified, the system 102 may be configured to analyse each road segment, from the sub-set of road segments. Based on the analysis of each road segment, a root cause of change in traffic pattern may be determined. In one example, the root cause of change in traffic pattern may be one of a road construction, a road repairing, a building construction and the like.

Once the root cause of change in traffic pattern is determined, the system 102 may be configured to generate an alert. The alert may be generated for updating one or more road segments in the geographical location.

Further, the system 102 may be configured to generate one or more recommendations, for road infrastructure planning, based on analysing the change in traffic pattern. The change in traffic pattern may be analysed using the data analytics and the machine learning algorithm. In one aspect, the change in traffic pattern may correspond to the traffic density, associated with each road segment, from the set of road segments. The one or more recommendations may be generated, when the traffic density, associated with the one or more road segments, is same or increasing over a time interval. The road infrastructure planning may correspond to an alternate road construction, a flyover construction, an underpass construction and the like. Further, the system for generating an alert based on change in traffic pattern is elaborated with respect to FIG. 2.

Figure 2:
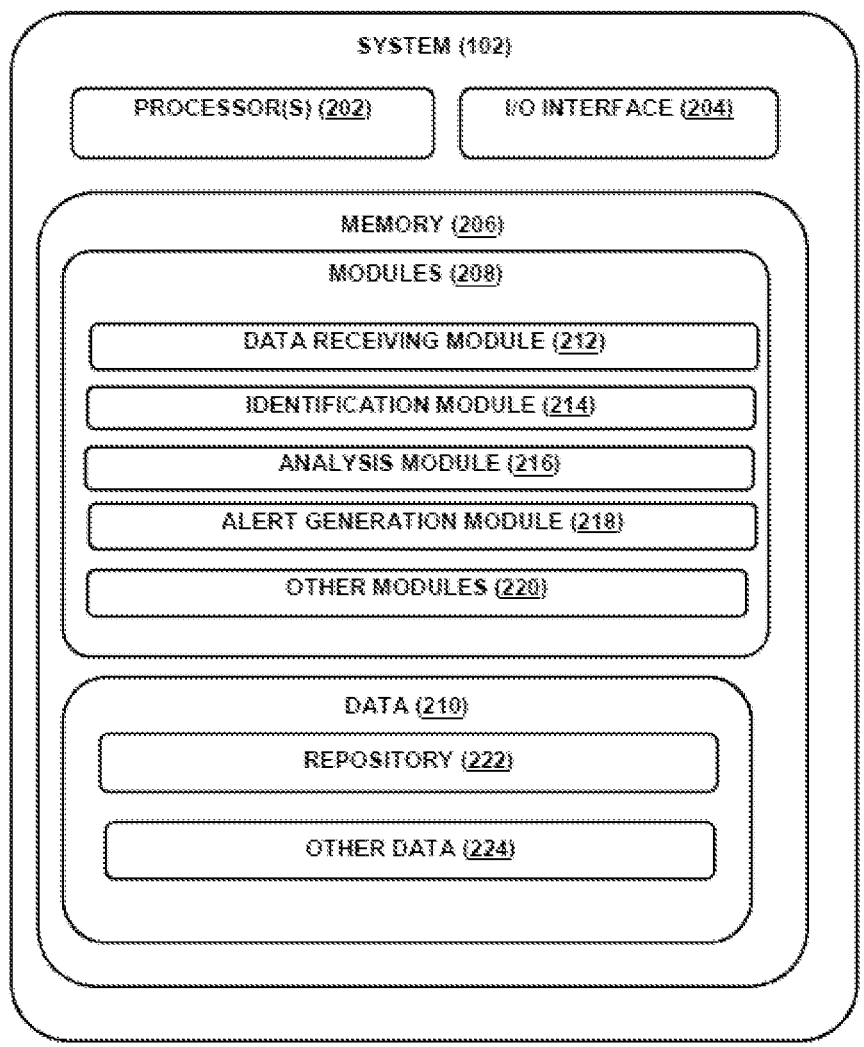
FIG. 2 illustrates the system for generating an alert based on change in traffic pattern, in accordance with an embodiment of the present subject matter.

Referring now to FIG. 2, the system 102 for generating an alert based on change in traffic pattern is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include data receiving module 212, an identification module 214, an analysis module 216, an alert generation module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the data receiving module 212 may be configured to receive traffic data, associated with a set of road segments in a geographical area. The traffic data may be received from one or more external data sources. The one or more external data sources may correspond to provider of Geographical Information System (GIS) data. In one embodiment, the GIS data may comprise the traffic data, associated with the set of road segments. In one example, the one or more road segments may collect the traffic data by deploying traffic sensors alongside of each road segment, by monitoring an average speed of vehicles, associated with each road segment, and the like.

In one aspect, the traffic data may comprise historic traffic data and current traffic data, associated with each road segment, from the set of road segments. In one example, the current traffic data may correspond to real-time traffic data, associated with each road segment. In one embodiment, the historic traffic data and the current traffic data may correspond to a traffic congestion on each road segment, from the set of road segments. In one aspect, the data receiving module 212 may store the historic traffic data and current traffic data in the repository 222.

Once the historic traffic data and the current traffic data are received, the identification module 214 may be configured to analyse the historic traffic data and the current traffic data. The historic traffic data and the current traffic data may be analysed using data analytics and a machine learning algorithm. In one example, one or more data analytics models and the machine learning algorithms may be scheduled for analysis of the historic traffic data and the current traffic data. In one embodiment, the historic traffic data, for a time frame, and the current traffic data, for the same time frame, may be analysed. In one exemplary embodiment, the identification module 214 may analyse the historic traffic data, from 7 AM to 9 AM, and the current traffic data, from 7 AM to 9 AM.

In one aspect, the identification module 214 may aggregate the historic data, associated with each road segment. In the aspect, the identification module 214 may extract a historic traffic pattern, associated with the historic traffic data, and a current traffic pattern, associated with the current traffic data, using the data analytics. Further, the identification module 214 may be configured to identify a change in traffic pattern, associated with each road segment, from the set of road segments, based on the historic traffic data and the current traffic data. In one aspect, the historic traffic pattern and the current traffic pattern may be analysed using the machine learning algorithm, to identify the change in traffic pattern. The change in traffic pattern may correspond to a traffic density associated with each road segment. In one example, the change in traffic pattern may correspond to one of an increase in traffic density, associated with the set of road segments, or a decrease in traffic density, associated with the set of road segments. In one embodiment, the change in traffic pattern may be an abrupt change identified based on the analysis of the historic traffic data and the current traffic data.

Upon identifying the change in traffic pattern, the identification module 214 may compare the change in traffic pattern with a pre-defined threshold. In one example, the pre-defined threshold may correspond to one of maximum increase in traffic pattern or maximum decrease in traffic pattern, associated with each road segment, from the set of road segments. Further, the identification module 214 may identify a sub-set of road segments, from the set of road segments, based on the comparison of the change in traffic pattern and the pre-defined threshold. In one example, the sub-set of road segments may correspond to road segments with the change in traffic pattern. In the example, the sub-set of road segments may comprise road segments with increased traffic density or road segments with decreased traffic density.

Further, the identification module 214 may be configured to generate a report. The report may comprise data corresponding to the sub-set of road segments, the traffic density, associated with the sub-set of road segments, and the like. In one aspect, the report may be generated based on analysing the traffic density for different time frames. In the aspect, the traffic density may be analysed using the data analytics and the machine learning algorithm. In one embodiment, a graphical view, associated with the sub-set of road segments, may be generated. In one example, the graphical view may be displayed to a user. The graphical view may show the traffic density associated with each road segment from the sub-set of road segments. The graphical view may be displayed on the user device 104.

Once the sub-set of road segments is identified, the analysis module 216 may be configured to analyse the sub-set of road segments. In one example, the sub-set of road segments may be analysed based on receiving road data from one or more cameras mounted alongside of road segments. Upon analysing the sub-set of road segments, the analysis module 216 may determine a root cause of the change in traffic pattern. In one aspect, the root cause may correspond to a road construction, a road repairing, a building construction, an accident and the like. In one example, the root cause may correspond to a reason that causes the abrupt change in traffic pattern of each road segment, from the sub-set of road segments.

Upon determining the root cause of change in traffic pattern, the alert generation module 218 may be configured to generate an alert. The alert may be generated for updating one or more road segments in the geographical area. The alert may be in a form of a notification. In one example, the alert may be an e-mail, a text message, API (Application Program Interface) call, and the like. In one aspect, the alert may inform the user about the change in traffic pattern and the root cause of the change in traffic pattern.

Further, the alert generation module 218 may be configured to analyse the change in traffic pattern. In one aspect, the alert generation module 218 may check if the change in traffic pattern is same or increasing over a time interval. In the aspect, the alert generation module 218 may predict an impact of the change in traffic pattern in future. Further, if the change in traffic pattern is same or increasing over the time interval is same or increasing, then the alert generation module 218 may generate one or more recommendations for road infrastructure planning In one example, the alert generation module 218 may use the machine learning algorithms and the data analytics to analyse the change in traffic pattern for generating the one or more recommendations. In one aspect, the road infrastructure planning may correspond to a flyover construction, an underpass construction, an alternate road construction and the like.

In one embodiment, the alert generation module 218 may generate a simulation for the road infrastructure planning. The simulation may be generated based on the one or more recommendations. In one aspect, the simulation may be used to select a recommendation from the one or more recommendations. In one aspect, the simulation may help the user to determine traffic management, associated with the one or more road segments in the geographical area. In one example, the alert generation module 218 may use one or more simulation platforms for generating the simulation of the road infrastructure planning In the example, an animated view of the road infrastructure planning may be generated based on the one or more simulation platforms.

Exemplary embodiments discussed above may provide certain advantages. Though not required to practice aspects of the disclosure, these advantages may include those provided by the following features.

Some embodiments of the system and the method enables generating an alert to update road segments in order to generate an exact map of the road segment.

Some embodiments of the system and the method enables generating recommendation for road infrastructure planning.

Figure 3:
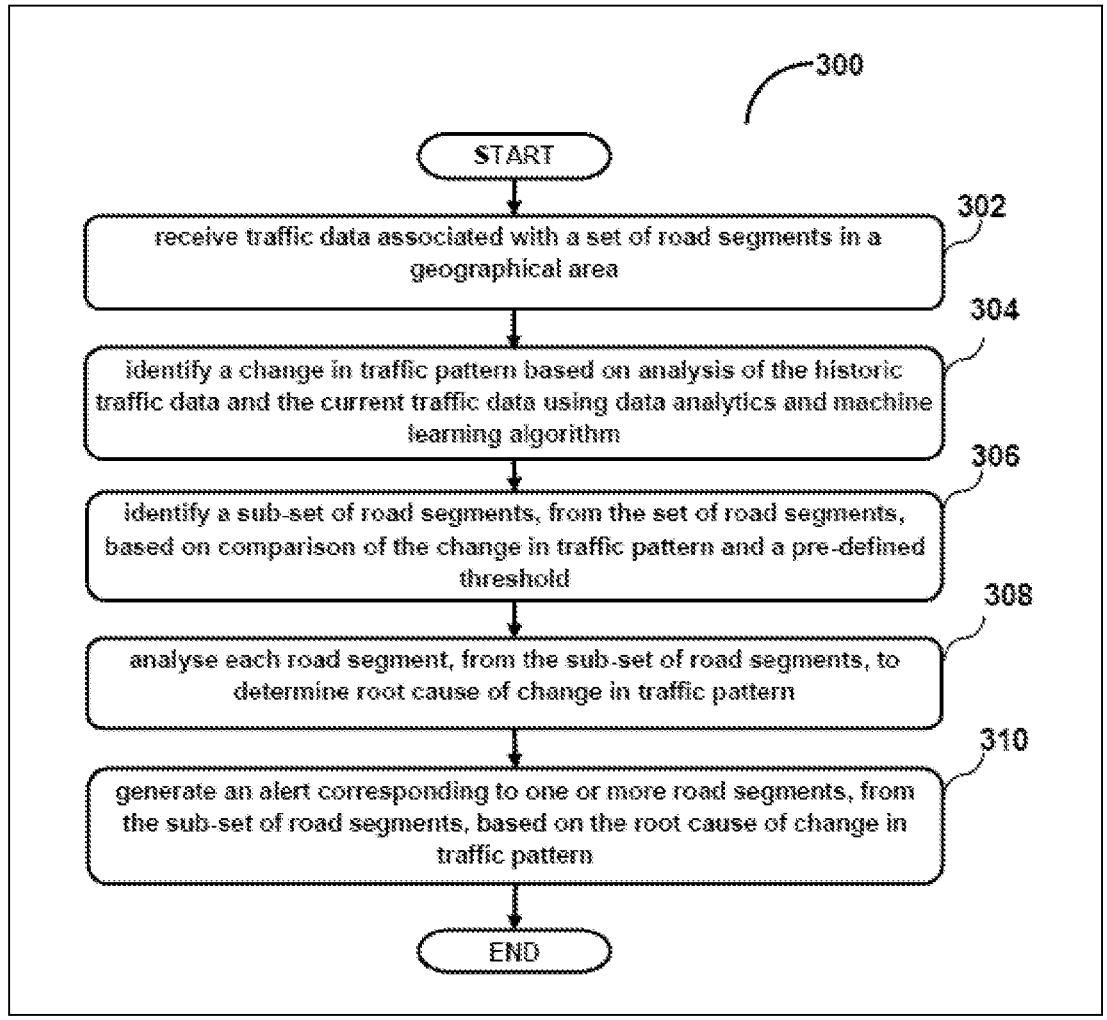
FIG. 3 illustrates a method for generating an alert based on change in traffic pattern, in accordance with an embodiment of the present subject matter.

Referring now to FIG. 3, a method 300 for generating an alert based on change in traffic pattern, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method 300 can be implemented in any suitable hardware, software, firmware, or combination thereof. However, for ease of explanation, in the embodiments described below, the method 300 may be considered to be implemented in the above described system 102.

At block 302, traffic data, associated with a set of road segments, may be received from one or more external sources. In one implementation, the data receiving module 212 may be configured to receive the traffic data. The traffic data may comprise historic traffic data and current traffic data, associated with each road segment, from the set of road segments.

At block 304, a change in traffic pattern, associated with each road segment, may be identified. In one implementation, the identification module 214 may identify the change in traffic pattern. The change in traffic pattern may be identified based on analysis of the historic traffic data and the current traffic data, using data analytics and a machine learning algorithm. In one aspect, the change in traffic pattern may correspond to a traffic density associated with each road segment, from the set of road segments.

At block 306, a sub-set of road segments, from the set of road segments, may be identified. In one implementation, the identification module 214 may identify the sub-set of road segments, from the set of road segments. The sub-set of road segments may be identified based on comparison of the change in traffic pattern and a pre-defined threshold.

At block 308, each road segment, from the sub-set of road segments may be analysed. In one implementation, the analysis model 216 may analyse each road segment, from the sub-set of road segments. Based on the analysis, a root cause of change in traffic pattern may be determined.

At block 310, an alert, corresponding to one or more road segments, from the sub-set of road segments, may be generated. In one implementation, the alert generation module 218 may generate the alert corresponding to the one or more road segments. The alert may be generated based on the root cause of change in traffic pattern. The alert may correspond to update the one or more road segments.

Although implementations for systems and methods for generating an alert based on change in traffic pattern have been described, it is to be understood that the appended claims are not necessarily limited to the specific features or methods described. Rather, the specific features and methods are disclosed as examples of implementations for generating the alert based on change in traffic pattern.

The invention claimed is:

1. A method for generating an alert based on change in traffic patterns, the method comprises steps of:
    receiving, by a processor, traffic data from one or more external resources associated with a set of road segments in a geographical area, wherein the traffic data comprises historic traffic data and current traffic data associated with the set of road segments, wherein the one or more external resources are providers of Geographical Information system (GIS) data, and wherein the traffic data is collected by one or more sensors placed along each road segment;
    identifying, by the processor, a change in traffic pattern based on analysis of the historic traffic data and the current traffic data, for each road segment from the set of road segments, using data analytics and a machine learning algorithm;
    identifying, by the processor, a sub-set of road segments, from the set of road segments, based on comparison of the change in traffic pattern for each segment with a predefined threshold;
    analyzing, by the processor, each road segment, from the sub-set of road segments, to determine a root cause of change in traffic pattern for each road segment from the sub-set of road segments;
    generating, by the processor, an alert corresponding to one or more road segments, from the sub-set of road segments, based on the root cause of change in traffic pattern associated with the one or more road segments; and
    generating, by the processor, one or more recommendations, based on a traffic density, for road infrastructure planning in the geographical area, wherein the one or more recommendations are generated when the traffic density associated with the one or more road segments is same or increasing over a time interval.

2. The method of claim 1, wherein the alert is generated as a notification for updating the one or more road segments associated with the geographical area based on the root cause of change in traffic pattern, wherein the alert is an API (Application Program Interface) call.

3. The method of claim 1, wherein the change in the traffic pattern indicates a traffic density associated with each road segment segment from the set of road segments.

4. The method of claim 3, further comprising generating a report based on analysis of the historic traffic data and the current traffic data, wherein the report comprises data associated with the traffic density on the set of road segments.

5. The method of claim 4, further comprising generating a simulation for the road infrastructure planning, based on the one or more recommendations associated with the road infrastructure planning.

6. A system for generating an alert based on change in traffic patterns, the system comprising:
    a non-transitory memory;
    a processor coupled to the non-transitory memory, wherein the processor is configured to execute programmed instructions stored in the non-transitory memory to:
        receive traffic data from one or more external resources associated with a set of road segments in a geographical area, wherein the traffic data comprises historic traffic data and current traffic data associated with the set of road segments, wherein the one or more external resources are providers of Geographical Information system (GIS) data, and wherein the traffic data is collected by one or more sensors placed along each road segment;
        identify a change in traffic pattern based on analysis of the historic traffic data and the current traffic data, for each road segment from the set of road segments, using data analytics and a machine learning algorithm;
        identify a sub-set of road segments, from the set of road segments, based on comparison of the change in traffic pattern for each segment with a predefined threshold;
        analyze each road segment, from the sub-set of road segments, to determine a root cause of change in traffic pattern for each road segment from the sub-set of road segments;
        generate an alert corresponding to one or more road segments, from the sub-set of road segments, based on the root cause of change in traffic pattern associated with the one or more road segments; and
        generate one or more recommendations, based on a traffic density, for road infrastructure planning in the geographical area, wherein the one or more recommendations are generated when the traffic density associated with the one or more road segments is same or increasing over a time interval.

7. The system of claim 6, wherein the alert is generated as a notification for updating the one or more road segments associated with the geographical area based on the root cause of change in traffic pattern, wherein the alert is an API (Application Program Interface) call.

8. The system of claim 6, wherein the change in the traffic pattern indicates a traffic density associated with each road segment from the set of road segments.

9. The system of claim 8, further configured to generate a report based on analysis of the historic traffic data and the current traffic data, wherein the report comprises data associated with the traffic density on the set of road segment.

10. The system of claim 6, further configured to generate a simulation for the road infrastructure planning, based on the one or more recommendations associated with the road infrastructure planning.

11. A non-transitory computer program product having embodied thereon a computer program for generating an alert based on change in traffic pattern, the computer program product comprises:

a program code for receiving traffic data from one or more external resources associated with a set of road segments in a geographical area, wherein the traffic data comprises historic traffic data and current traffic data associated with the set of road segments, wherein the one or more external resources are providers of Geographical Information system (GIS) data, and wherein the traffic data is collected by one or more sensors placed along each road segment;

a program code for identifying a change in traffic pattern based on analysis of the historic traffic data and the current traffic data, for each road segment from the set of road segments, using data analytics and a machine learning algorithm;

a program code for identifying a sub-set of road segments, from the set of road segments, based on comparison of the change in traffic pattern for each segment with a predefined threshold;

a program code for analyzing each road segment, from the sub-set of road segments, to determine a root cause of change in traffic pattern for each road segment from the sub-set of road segments;

a program code for generating an alert corresponding to one or more road segments, from the sub-set of road segments, based on the root cause of change in traffic pattern associated with the one or more road segments; and a program code for generating one or more recommendations, based on a traffic density, for road infrastructure planning in the geographical area, wherein the one or more recommendations are generated when the traffic density associated with the one or more road segments is same or increasing over a time interval.

\* \* \* \* \*